(12) United States Patent
Nishimori et al.

(10) Patent No.: US 10,036,943 B2
(45) Date of Patent: Jul. 31, 2018

(54) LIGHT SOURCE DEVICE, IMAGE PROJECTOR, AND METHOD FOR DISPOSING LIGHT SOURCE DEVICE

(71) Applicants: Takehiro Nishimori, Kanagawa (JP); Tetsuya Fujioka, Kanagawa (JP); Yasunari Mikutsu, Tokyo (JP); Hideo Kanai, Kanagawa (JP); Satoshi Tsuchiya, Kanagawa (JP); Jun Mashimo, Tokyo (JP)

(72) Inventors: Takehiro Nishimori, Kanagawa (JP); Tetsuya Fujioka, Kanagawa (JP); Yasunari Mikutsu, Tokyo (JP); Hideo Kanai, Kanagawa (JP); Satoshi Tsuchiya, Kanagawa (JP); Jun Mashimo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/645,181

(22) Filed: Jul. 10, 2017

(65) Prior Publication Data
US 2018/0059521 A1 Mar. 1, 2018

(30) Foreign Application Priority Data
Aug. 23, 2016 (JP) .................................. 2016-162920

(51) Int. Cl.
*F21V 9/16* (2006.01)
*G03B 21/16* (2006.01)
(Continued)

(52) U.S. Cl.
CPC ................ *G03B 21/16* (2013.01); *F21K 9/64* (2016.08); *F21V 9/16* (2013.01); *F21V 9/30* (2018.02);
(Continued)

(58) Field of Classification Search
USPC ............................................... 362/84
See application file for complete search history.

(56) References Cited

U.S. PATENT DOCUMENTS

| | | | | |
|---|---|---|---|---|
| 2010/0002433 A1* | 1/2010 | Liu | ....................... | F21V 19/001 362/235 |
| 2010/0128482 A1* | 5/2010 | Zhou | ..................... | F21V 29/004 362/253 |

(Continued)

FOREIGN PATENT DOCUMENTS

| | | |
|---|---|---|
| JP | 2012-078564 | 4/2012 |
| JP | 2015-036708 | 2/2015 |

*Primary Examiner* — Tuyen K Vo
(74) *Attorney, Agent, or Firm* — Harness, Dickey & Pierce, P.L.C.

(57) ABSTRACT

A light source device includes a first light-source unit, a second light-source unit, and a third light-source unit emitting light of spectra different from each other. Each of the first through third light-source units includes a heat dissipator and a light source. The light source includes a light emitting device. The heat dissipators of the first through third light-source units are disposed in an ascending order of values of T/Q of the first through third light-source units, in a direction of cooling air flow. "Q" represents a heat generation amount from the light source of each of the first through third light-source units, when the light sources are driven to obtain predetermined light intensity and lifespan. "T" represents a preset, upper-limit temperature for the light emitting device of each of the first through third light-source units to obtain the predetermined light intensity and lifespan.

10 Claims, 5 Drawing Sheets

(51) Int. Cl.
*G03B 21/20* (2006.01)
*F21V 29/70* (2015.01)
*F21K 9/64* (2016.01)
*F21V 29/51* (2015.01)
*F21V 29/67* (2015.01)
*F21V 29/71* (2015.01)
*F21V 9/30* (2018.01)
*F21Y 113/13* (2016.01)
*F21Y 115/30* (2016.01)

(52) U.S. Cl.
CPC .............. *F21V 29/51* (2015.01); *F21V 29/67* (2015.01); *F21V 29/70* (2015.01); *F21V 29/713* (2015.01); *G03B 21/204* (2013.01); *G03B 21/2013* (2013.01); *F21Y 2113/13* (2016.08); *F21Y 2115/30* (2016.08)

(56) References Cited

U.S. PATENT DOCUMENTS

| | | | |
|---|---|---|---|
| 2011/0013402 A1* | 1/2011 | Little, Jr. | F21V 15/01 362/311.01 |
| 2011/0037387 A1* | 2/2011 | Chou | F21V 29/004 315/35 |
| 2011/0297976 A1* | 12/2011 | Chao | F21K 9/00 257/89 |
| 2012/0162987 A1* | 6/2012 | Liu | F21S 8/00 362/249.02 |
| 2012/0261689 A1* | 10/2012 | Appelt | H01L 21/4832 257/98 |
| 2013/0088882 A1* | 4/2013 | Guercio | F21V 29/004 362/373 |
| 2015/0042963 A1 | 2/2015 | Nishimori et al. | |

* cited by examiner

LIGHT SOURCE DEVICE, IMAGE PROJECTOR, AND METHOD FOR DISPOSING LIGHT SOURCE DEVICE

CROSS-REFERENCE TO RELATED APPLICATION

This patent application is based on and claims priority pursuant to 35 U.S.C. § 119(a) to Japanese Patent Application No. 2016-162920, filed on Aug. 23, 2016, in the Japan Patent Office, the entire disclosure of which is hereby incorporated by reference herein.

BACKGROUND

Technical Field

Embodiments of the present disclosure generally relate to a light source device, an image projector, and a method for disposing a light source device, and more particularly, to a light source device for emitting light, an image projector for projecting an image with the light source device, and a method for disposing a light source device in an image projector.

Related Art

Various types of image projectors are known, which include a housing, an optical source device accommodated in the housing, a ventilator, an intake, a vent, and the like. Such an optical source device, which is typically accommodated in the housing of the image projector, includes a plurality of optical-source units each including a light emitting device (e.g., semiconductor laser), a heat dissipator, and the like. The heat dissipators of the plurality of optical-source units are often disposed on a cooling air path formed between the intake and the vent of the image projector.

SUMMARY

In one embodiment of the present disclosure, a novel light source device is described that includes a first light-source unit, a second light-source unit, and a third light-source unit. The first light-source unit, the second light-source unit, and the third light-source unit emit light of spectra different from each other. Each of the first light-source unit, the second light-source unit, and the third light-source unit includes a heat dissipator and a light source. The light source includes a light emitting device. The heat dissipator of the first light-source unit, the heat dissipator of the second light-source unit, and the heat dissipator of the third light-source unit are disposed in an ascending order of values of T/Q of the first light-source unit, the second light-source unit, and the third light-source unit, in a direction of cooling air flow. "Q" represents a heat generation amount from the light source of each of the first light-source unit, the second light-source unit, and the third light-source unit, when the light source of each of the first light-source unit, the second light-source unit, and the third light-source unit is driven to obtain predetermined light intensity and lifespan. "T" represents a preset, upper-limit temperature for the light emitting device of each of the first light-source unit, the second light-source unit, and the third light-source unit to obtain the predetermined light intensity and lifespan.

Also described are a novel image projector incorporating the light source device and a method for disposing a light source device in an image projector.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
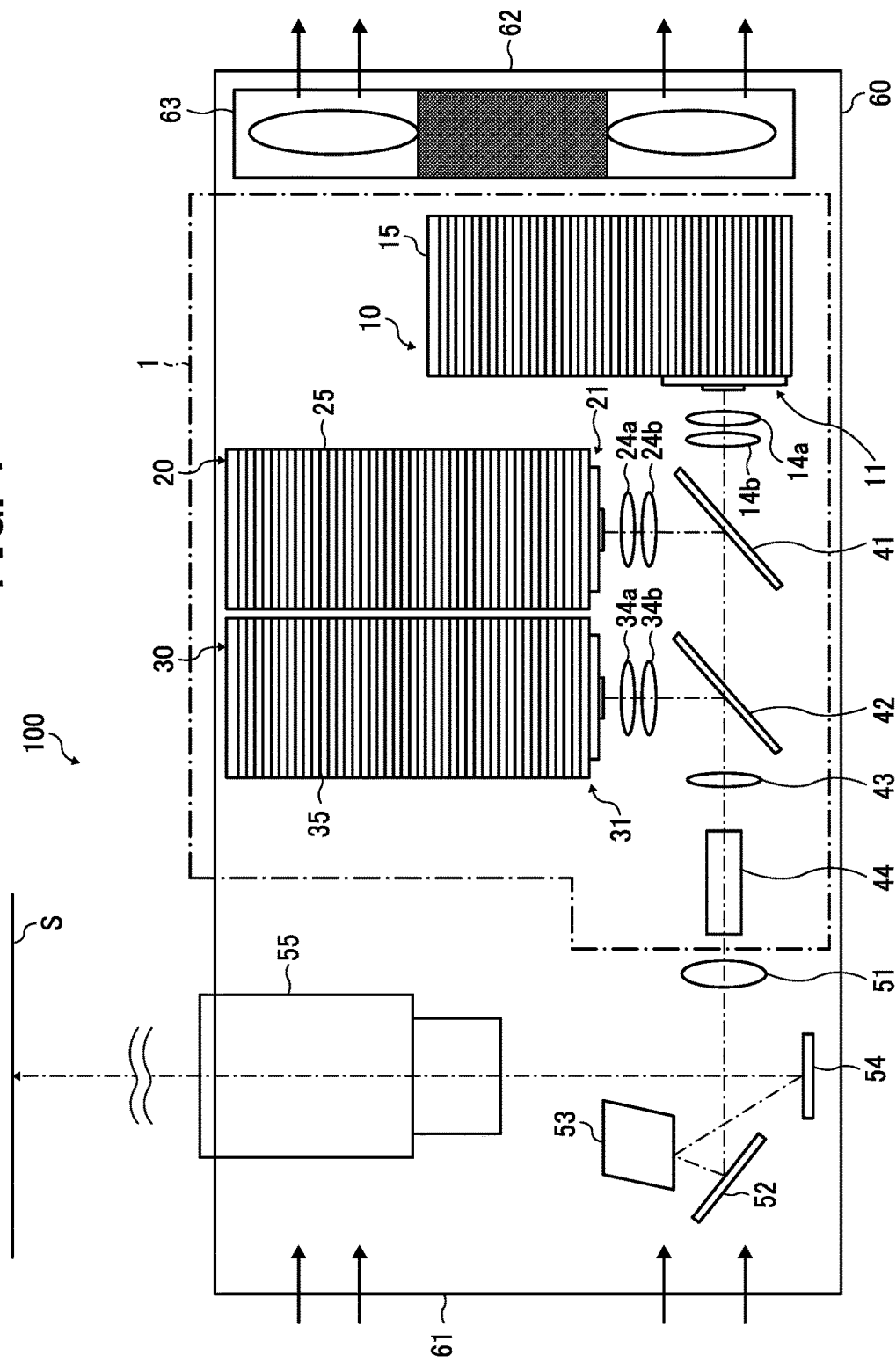
FIG. 1 is a schematic view of a first example of a projector according to an embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring now to the drawings, a description is given of a projector incorporating a light source device according to an embodiment of the present disclosure. The projector functions as an image projector. The projector is hereinafter referred to as a projector 100. Similarly, the light source device is hereinafter referred to as a light source device 1.

The projector 100 of the present embodiment includes three light-source units that emit light of colors different from each other, that is, light of spectra different from each other. Specifically, the projector 100 includes a blue light-source unit (e.g., blue light-source unit 10) as a first light-source unit, a red light-source unit (e.g., red light-source unit 20) as a second light-source unit, and a green light-source unit (e.g., green light-source unit 30) as a third light-source unit. Each of the blue, red, and green light-source units has a light source (e.g., light sources 11, 21, and 31) and a heat dissipator (e.g., heat sinks 15, 25, and 35). The light source has a light emitting device (e.g., blue light-source element 9). The projector 100 attains some advantages as follows, in a method for cooling down the blue, red, and green light-source units.

To substantially equalize lifespans of the light emitting devices of the blue, red, and green light-source units, the heat dissipators of the light-source units are disposed in an ascending order of values of T/Q, that is, a preset temperature T of the light emitting device divided by a heat generation amount Q of the light source of each of the blue, red, and green light-source units in a direction of cooling air flow in a cooling air path in the projector 100, that is, from an upstream side to a downstream side of the cooling air path.

The light emitting devices disposed in the light sources of the blue, red, and green light-source units have identical or substantially identical temperature characteristics. The temperature characteristics indicate characteristics of reduction in output of light relative to the temperature.

Generally, image projectors are often used to project, e.g., computer displays, video images, or images according to image data stored in, e.g., a memory card, to a projected surface such as a screen. Such projectors condense light emitted by a light source to a micromirror display element called a digital micromirror device (DMD), or to a liquid crystal plate, so as to project or display images such as color images on a screen.

Typically, such projectors incorporate a high-intensity discharge lamp (HID lamp) as a light source. However, recent projectors often incorporate a light source device that employs solid-state lighting (SSL) that uses, e.g., a semiconductor laser or a light-emitting diode (LED).

Such a light source device includes short-wavelength light sources, namely, red, green, and blue light sources that continuously emit red light (R), green light (G), and blue light (B), respectively. Compared to a discharge lamp, the light source device enhances, e.g., color reproducibility, luminous efficiency, and light use efficiency while lengthening its lifespan. In addition, the light sources are point sources (or parallel beams), facilitating designing an illumination system. Accordingly, the light sources have some advantages such as facilitated color composition and reduced numerical aperture (NA).

Recent projectors often incorporate red and green light sources each of which accommodates a blue light source and a phosphor. Specifically, in the red light source emits red light with the phosphor irradiated with light emitted by the blue light source and converting the wavelength of the light. Similarly, the green light source emits green light with the fluorescent body irradiated with light emitted by the blue light source and converting the wavelength of the light. Thus, by use of three light sources, that is, a blue light source and the two light sources that convert the wavelength of the blue light and respectively generate red light and green light, light from the same type of blue light sources can be used with identical temperature characteristics. As a consequence, design flexibility is enhanced.

Now, a description is given of a comparative image projector.

The comparative image projector (image display device body) includes a light source device in a housing. The light source device includes a plurality of light-source units, each of which includes light emitting devices.

Specifically, the image projector includes the housing (i.e., device housing) that includes an intake and a vent, a cooling air path that couples the intake and the vent, and a ventilator (e.g., cooling fan) that causes cooling air flow in the cooling air path.

The light source device includes first through third light-source units that emit light of spectra different from each other. The first light source device is, e.g., a blue laser light source device. The second light source device is, e.g., a red laser light source device. The third light source device is, e.g., a green laser light source device. The three light-source units are disposed on the cooling air path between the intake and the vent of the image projector provided with the ventilator.

A maximum operating temperature at which the second light-source unit (i.e., red laser light source device) can be used is lower than that of the other light-source units (i.e., first and third laser light source devices). Therefore, a heat dissipator of the second light-source unit is disposed upstream from heat dissipators of the other light-source units (i.e., first and third laser light source devices) in the direction of cooling air flow in the cooling air path.

Such a configuration cools down first the heat dissipator of the second light-source unit having a lowest maximum operating temperature, thereby particularly preventing a temperature rise of the second light-source unit. Accordingly, if the image projector is continuously used for a relatively long time, light (e.g., laser beams) of the three colors is stably output.

However, the comparative image projector may suffer from various disadvantages as described below.

Upon image projection, the light emitting devices disposed in the light sources of the light-source units in the light source device differ from each other in heat generation amount due to the color generation ratio and the luminous efficiency of the light emitting devices. That is, the light emitting devices of the light-source units have different lifespans from each other relative to the temperature. In other words, the light emitting devices of the light-source units rarely have substantially identical lifespans.

In addition, basically, a temperature rise of the light emitting devices may lead to reduction in lifespan of the light emitting devices. To substantially equalize the lifespans of the light emitting devices of the light-source units, the light emitting devices of the light-source units may be cooled down to a temperature sufficient to satisfy a desired lifespan of the light emitting devices.

Generally, a heat dissipator disposed at an extreme upstream position in the direction of cooling air flow is cooled down most efficiently. However, since the light emitting devices of the light source units differ from each other in luminous efficiency, the heat dissipator of the light-source unit having a lowest maximum operating temperature may not always need a highest cooling capacity when each of the light emitting devices of the light-source units is used at a temperature not greater than a maximum operating temperature thereof.

Therefore, to substantially equalize the lifespans of the light emitting devices of the light-source units in the comparative image projector, either one of the heat dissipators disposed downstream in the direction of cooling air flow may be enlarged in surface area, for example. Alternatively, the ventilator (e.g., cooling fan) may be rotated at a high speed according to an amount of heat dissipated from the heat dissipators.

Enlargement in the surface area of either one of the heat dissipators disposed downstream in the direction of cooling air flow may result in upsizing of the housing of the image projector. High-speed rotation of the ventilator (e.g., cooling fan) according to the amount of heat dissipated from the heat dissipators may result in an increase in noise from the ventilator.

To address these circumstances, according to the present embodiment, the heat dissipators of the light-source units are disposed in the ascending order of values of T/Q, that is, the preset temperature T of the light emitting device divided by the heat generation amount Q of the light sources of the light-source units in the direction of cooling air flow in the cooling air path, that is, from the upstream side to the downstream side of the cooling air path. Accordingly, the lifespans of the light-source units of the light source device are substantially equalized.

Now, a detailed description is given of a plurality of examples of the projector 100 according to the present embodiment.

Figure 2A:
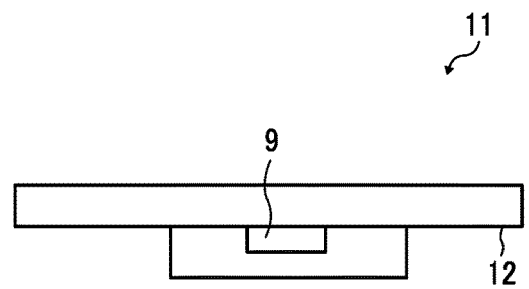
FIG. 2A is a schematic view of a blue light source of a blue light-source unit incorporated in a light source device of the projector of FIG. 1.
Figure 2B:
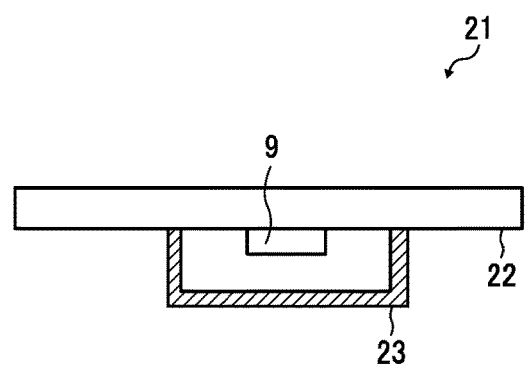
FIG. 2B is a schematic view of a red light source of a red light-source unit incorporated in the light source device of the projector of FIG. 1.
Figure 2C:
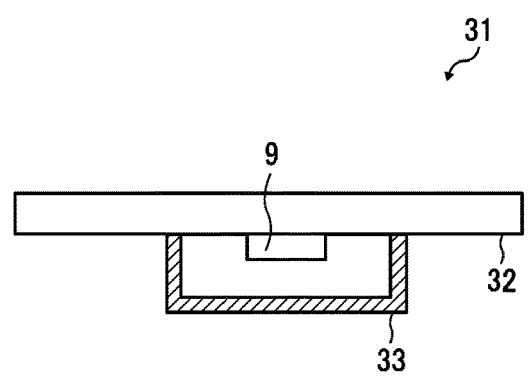
FIG. 2C is a schematic view of a green light source of a green light-source unit incorporated in the light source device of the projector of FIG. 1.

Initially with reference to FIGS. 1 through 2C, a description is given of a first example of the projector 100.

FIG. 1 is a schematic view of the projector 100 according to the first example. FIGS. 2A through 2C are schematic views of the light sources of the light-source units incorporated in the light source device 1 of the projector 100. Specifically, FIG. 2A is a schematic view of a blue light source 11 of a blue light-source unit 10 incorporated in the light source device 1 of the projector 100. FIG. 2B is a schematic view of a red light source 21 of a red light-source unit 20 incorporated in the light source device 1 of the projector 100. FIG. 2C is a schematic view of a green light source 31 of a green light-source unit 30 incorporated in the light source device 1 of the projector 100.

As illustrated in FIG. 1, the projector 100 includes, e.g., a housing 60 that includes an intake 61 and a vent 62. In the present embodiment. the intake 61 is provided on a left side of the housing 60. The vent 62 is provided on a right side of the housing 60. A cooling air path, defined by the, couples the intake 61 and the vent 62. A cooling fan 63 is disposed inside the housing 60 where the vent 62 is provided, to cause cooling air flow in the cooling air path.

The light source device 1 of the projector 100 is substantially centered in the housing 60 in a lateral direction in FIG. 1, while being situated on a left side of the cooling fan 63.

In a lower portion of the housing 60 leftward from the light source device 1 are a fourth condenser lens 51, a first reflection mirror 52, a second reflection mirror 53, and an image forming panel 54. The fourth condenser lens 51 condenses light beams emitted by the light source device 1. The first reflection mirror 52 and the second reflection mirror 53 reflect the light beams thus condensed by the fourth condenser lens 51 to direct the light beams to the image forming panel 54.

A projector lens 55 is disposed upward from the image forming panel 54 in FIG. 1. The projector lens 55 magnifies and projects image light reflected from the image forming panel 54 onto a screen S.

The light source device 1 of the projector 100 includes the blue light-source unit 10, the red light-source unit 20, and the green light-source unit 30.

Each of the light-source units 10, 20, and 30 includes a light source, first and second condenser lenses, and a heat sink. The light source includes, e.g., a blue light-source element 9 mounted on a substrate. The first and second condenser lenses render divergent beams from the light source into parallel beams. The heat sink is a heat dissipation board serving as a heat dissipator that dissipates heat generated by the light source, more specifically, by the blue light-source element 9.

Now, a detailed description is given of a configuration of each of the blue light-source unit 10, the red light-source unit 20, and the green light-source unit 30 in the light source device 1.

As illustrated in FIG. 2A, the blue light source 11 disposed in the blue light-source unit 10 includes the blue light-source element 9 and a metal substrate 12 for blue (hereinafter referred to as a blue substrate 12). The blue light-source element 9 is a light emitting device (optical semiconductor element) disposed on the blue substrate 12. The blue light-source element 9 is electrically coupled and fixed to the blue substrate 12.

A first condenser lens 14a and a second condenser lens 14b render divergent beams emitted by the blue light source 11 into parallel beams. The parallel beams pass through a first dichroic mirror 41 and a second dichroic mirror 42 to reach a third condenser lens 43. The first dichroic mirror 41 has characteristics to transmit light of a spectrum of blue and to reflect light of a spectrum of red. On the other hand, the second dichroic mirror 42 has characteristics to transmit light of spectra of blue and red, and to reflect light of a spectrum of green.

As illustrated in FIG. 2B, the red light source 21 disposed in the red light-source unit 20 includes the blue light-source element 9, a metal substrate 22 for red (hereinafter referred to as a red substrate 22), and a fluorescent layer 23 for red (hereinafter referred to as a red fluorescent layer 23). The blue light-source element 9 as a light emitting device (optical semiconductor element) is disposed on the red substrate 22. The blue light-source element 9 is electrically coupled and fixed to the red substrate 22. The red fluorescent layer 23 is disposed in front of the blue light-source element 9 in a direction in which the blue light-source element 9 emits light. The red fluorescent layer 23 is irradiated with the light (i.e., blue-component light), and generates red-component fluorescence different from the blue-component light.

A first condenser lens 24a and a second condenser lens 24b render divergent beams emitted by the red light source 21 into parallel beams. The parallel beams are reflected from the first dichroic mirror 41, and then pass through the second dichroic mirror 42 to reach the third condenser lens 43.

As illustrated in FIG. 2C, the green light source 31 disposed in the green light-source unit 30 includes the blue light-source element 9, a metal substrate 32 for green (hereinafter referred to as a green substrate 32), and a fluorescent layer 33 for green (hereinafter referred to as a green fluorescent layer 33). The blue light-source element 9 as a light emitting device (optical semiconductor element) is disposed on the green substrate 32. The blue light-source element 9 is electrically coupled and fixed to the green substrate 32. The green fluorescent layer 33 is disposed in front of the blue light-source element 9 in the direction in which the blue light-source element 9 emits light. The green fluorescent layer 33 is irradiated with the light (i.e., blue-component light), and generates green-component fluorescence different from the blue-component light.

A first condenser lens 34a and a second condenser lens 34b render divergent beams emitted by the green light source 31 into parallel beams. The parallel beams are reflected from the second dichroic mirror 42 to reach the third condenser lens 43.

The blue light-source element 9 has significantly poor temperature characteristics, that is, poor characteristics of reduction in output of light relative to the temperature. In the present embodiment, since red light, blue light, and green light are all formed by use of the blue light-source elements 9, however, the temperature characteristics do not restrict the arrangement of the blue, red, and green light-source units 10, 20, and 30, respectively.

The third condenser lens 43 shapes the parallel beams from the blue light source 11 of the blue light-source unit 10, the red light source 21 of the red light-source unit 20, and the green light source 31 of the green light-source unit 30, into micro spot beams. Then, the third condenser lens 43 directs the micro spot beams to a light tunnel 44.

In the light tunnel 44, the light beams are multiply reflected. The light beams from the blue light source 11 of the blue light-source unit 10, the red light source 21 of the red light-source unit 20, and the green light source 31 of the green light-source unit 30 are overlapped and added together, while being equalized.

Then, the fourth condenser lens 51 renders the light beams passing through the light tunnel 44 of the light source device 1 into parallel beams. The parallel beams are then reflected from the first reflection mirror 52 and the second reflection mirror 53 to the image forming panel 54.

The image forming panel 54 is controlled by, e.g., an image generator of a controller of the projector 100. The image forming panel 54 reflects the light having a component of each color as light to be projected (hereinafter referred to as projection light), toward the projector lens 55. The projector lens 55 magnifies and projects the projection light onto the screen S. That is, the projection light is projected onto the screen S as a projection image. Thus, a magnified color image is formed on the screen S.

In the present example, the image forming panel 54 is a reflective panel such as a DMD that forms an image according to a modulation signal. Alternatively, the image forming panel 54 may be a transmissive panel.

The light tunnel 44 illustrated in FIG. 1 is a representative example of an exposure equalizer according to the present example. The projector lens 55 is a representative example of a projection optical system according to the present example.

As described above, each of the light-source units 10, 20, and 30 includes a heat sink. The heat sink is a heat dissipation board serving as a heat dissipator that dissipates heat generated by light emission of the blue light-source element 9 disposed in each of the light sources 11, 21, and 31 of the respective light-source units 10, 20, and 30. The heat sink is coupled to the corresponding substrate of the light source in each of the light-source units.

More specifically, a heat sink 15 for blue (hereinafter referred to as a blue heat sink 15) is coupled to the blue substrate 12 of the blue light source 11 disposed in the blue light-source unit 10. A heat sink 25 for red (hereinafter referred to as a red heat sink 25) is coupled to the red substrate 22 of the red light source 21 disposed in the red light-source unit 20. A heat sink 35 for green (hereinafter referred to as a green heat sink 35) is coupled to the green substrate 32 of the green light source 31 disposed in the green light-source unit 30.

As illustrated in FIG. 1, behind the blue heat sink 15 is the cooling fan 63, which is an axial flow fan serving as a ventilator. Activation of the cooling fan 63 takes cooling air into the housing 60 through the intake 61. The air passes through the cooling air path and exits from the housing 60 via the vent 62.

Now, a description is given of a relation of the heat generation amounts Q from the light sources 11, 21, and 31 of the respective light-source units 10, 20, and 30 in the light source device 1.

The relation of heat generation amounts Q is satisfied as below when the light sources 11, 21, and 31 of the respective light-source units 10, 20, and 30 are driven to obtain predetermined light intensity and lifespan upon projection of a color image onto the screen S by the projector 100 of the present example.

Specifically, a blue heat generation amount Q1 is an amount of heat generated from the blue light source 11 disposed in the blue light-source unit 10. A red heat generation amount Q2 is an amount of heat generated from the red light source 21 disposed in the red light-source unit 20. A green heat generation amount Q3 is an amount of heat generated from the green light source 31 disposed in the green light-source unit 30. In the present example, the green heat generation amount Q3 is the greatest heat generation amount among the heat generation amounts Q1 through Q3. The red heat generation amount Q2 is smaller than the green heat generation amount Q3 on the one hand, the red heat generation amount Q2 is greater than the blue heat generation amount Q1 on the other hand. The blue heat generation amount Q1 is the smallest heat generation amount among the heat generation amounts Q1 through Q3. In short, a relation of $Q3<Q2<Q1$ is satisfied.

The light sources 11, 21, and 31 of the respective light-source units 10, 20, and 30 include the blue light-source elements 9 specified identically, for which identical upper-limit temperatures (i.e., preset temperatures T) are preset to obtain the predetermined light intensity and lifespan. Specifically, a blue preset temperature T1 is a temperature preset for the blue light source 11 disposed in the blue light-source unit 10. A red preset temperature T2 is a temperature preset for the red light source 21 disposed in the red light-source unit 20. A green preset temperature T3 is a temperature preset for the green light source 31 disposed in the green light-source unit 30. In the present example, the preset temperatures T1, T2, and T3 are identical to each other. In other words, a relation of $T1=T2=T3$ is satisfied.

Now, a description is given of an example of an index of a magnitude relation of cooling capacities of the light-source units 10, 20, and 30 to cool down the light sources 11, 21, and 31, respectively.

As an index of the magnitude relation of cooling capacities, a ratio R is used. The ratio R is a ratio of the preset temperature T of the light emitting device of each of the light sources 11, 21, and 31 to the heat generation amount Q of each of the light sources 11, 21, and 31 of the respective light-source units 10, 20, and 30 when the light sources 11, 21, and 31 of the respective light-source units 10, 20, and 30 are driven to obtain the predetermined light intensity and lifespan. In short, the ratio R indicates a value of T/Q.

The ratio R (i.e., T/Q) correlated with the magnitude relation of cooling capacities of the light-source units 10, 20, and 30 to cool down the light sources 11, 21, and 31, respectively, is also expressed as R=(the preset temperature T)/(the heat generation amount Q).

Specifically, a blue ratio R1 is a ratio of the blue preset temperature T1 to the blue heat generation amount Q1 (i.e., T1/Q1) of the blue light-source unit 10. A red ratio R2 is a ratio of the red preset temperature T2 to the red heat generation amount Q2 (i.e., T2/Q2) of the red light-source unit 20. A green ratio R3 is a ratio of the green preset temperature T3 to the green heat generation amount Q3 (i.e., T3/Q3) of the green light-source unit 30. In the present example, a relation of R3<R2<R1 is satisfied.

The preset temperature T of each of the light-source units 10, 20, and 30 is a sum of a design reference temperature T0 and an increased temperature ΔT. The design reference temperature T0 is a reference temperature determined in dissipation designing of the light source device 1. On the other hand, the increased temperature ΔT is a temperature increased when the light sources 11, 21, and 31 of the respective light-source units 10, 20, and 30 are driven to obtain the predetermined light intensity and lifespan. Accordingly, the ratio R (i.e., T/Q) is correlated with a heat resistance value of each of the light sources 11, 21, and 31 of the respective light-source units 10, 20, and 30.

That is, the above-described ratio R (i.e., T/Q) can be used quantitatively as an index of the magnitude relation of cooling capacities of the light-source units 10, 20, and 30 to cool down the light sources 11, 21, and 31, respectively.

A smallest ratio R (i.e., T/Q) or a smallest heat resistance value indicates difficulty in cooling, rendering a greatest cooling capacity necessary.

Specifically, in the present example, the green light source 31 of the green light-source unit 30 is cooled down with the greatest cooling capacity among the light sources 11, 21, and 31. The red light source 21 of the red light-source unit 20 is cooled down with a cooling capacity smaller than the cooling capacity with which the green light source 31 is cooled down on the one hand, the red light source 21 is cooled down with a cooling capacity greater than the cooling capacity with which the blue light source 11 is cooled down on the other hand. The blue light source 11 of the blue light-source unit 10 is cooled down with the smallest cooling capacity among the light sources 11, 21, and 31.

Generally, an increase in the cooling capacity to maximum needs an increase in surface area of a heat dissipation board, such as a heat sink as a heat dissipator, together with high-speed cooling air. Alternatively, exposure to a greater flow of cooling air could achieve the same effect, as described below.

To address this circumstance, according to the present embodiment, the light sources 11, 21, and 31 and the heat sinks 15, 25, and 35 (i.e., heat dissipation boards) as heat dissipators of the respective light-source units 10, 20, and 30 are disposed in an ascending order of values of T/Q (i.e., ratio R) of the light sources 11, 21, and 31 of the respective light-source units 10, 20, and 30 in the direction of cooling air flow in the cooling air path, that is, from the upstream side to the downstream side of the cooling air path formed between the intake 61 and the vent 62 illustrated in FIG. 1.

By disposing the light sources 11, 21, and 31 and the heat sinks 15, 25, and 35 (e.g., heat dissipation boards) of the respective light-source units 10, 20, and 30 as described above, cooling air (i.e., cooling fluid) coming from outside is supplied firstly to the light source having the smallest ratio R (i.e., T/Q) and the heat sink coupled to the light source.

That is, in a configuration of the present example, heat is most efficiently dissipated from the green heat sink 35 (i.e., heat dissipation board) coupled to the green light source 31 having the smallest ratio R3 (i.e., T3/Q3). Accordingly, the size of the green heat sink 35 can be minimized, downsizing the projector 100. In addition, the cooling fan 63 can be downsized and rotated at a decreased speed, reducing noise from the cooling fan 63.

In the present example, the red light source 21 is disposed downstream from the green light source 31 having the smallest ratio R3 (i.e., T3/Q3) in the direction of cooling air flow in the cooling air path. The ratio R2 (i.e., T2/Q2) of the red light source 21 is relatively large. Therefore, the red heat sink 25 (i.e., heat dissipation board) coupled to the red light source 21 is smaller than the green heat sink 35 of the green light source 31 having the smallest ratio R, specifically, the ratio R3 (i.e., T3/Q3). That is, the red heat sink 25 rarely affects upsizing of the projector 100.

Relatedly, the blue light source 11 is disposed downstream from the red light source 21 in the direction of cooling air flow in the cooling air path. The ratio R1 (i.e., T1/Q1) of the blue light source 11 is greater than the ratio R2 of the red light source 21 and the ratio R3 of the green light source 31. That is, the blue heat sink 15 most rarely affects upsizing of the projector 100 among the heat sinks 15, 25, and 35.

Thus, a light-source unit including a light source having a smallest ratio R (i.e., T/Q) mostly affects the device size, that is, the size of the housing 60 of the projector 100.

Accordingly, by disposing the light sources 11, 21, and 31 and the heat sinks 15, 25, and 35 of the respective light-source units 10, 20, and 30 as described above, the light-source units 10, 20, and 30 are efficiently cooled down without an increase in noise. In addition, the lifespans of the blue light-source elements 9 of the respective light sources 11, 21, and 31 are substantially equalized. Moreover, the projector 100 is downsized compared to typical projectors.

Thus, according to the present example, the light source device 1 substantially equalizes the lifespan of the blue light-source elements 9 disposed in the light sources 11, 21, and 31 of the respective light-source units 10, 20, and 30 while keeping output of light from the light-source units 10, 20, and 30 stable. In addition, the light source device 1 downsizes the housing 60 of the projector 100 and reduces noise from the cooling fan 63.

With the light source device 1 described above, the projector 100 equalizes the lifespans of the blue light-source elements 9 of the light-source units 10, 20, and 30 while downsizing the housing 60 and reducing noise from the cooling fan 63.

A method for disposing the light sources 11, 21, and 31 and the heat sinks 15, 25, and 35 serving as heat dissipators of the respective light-source units 10, 20, and 30 as described above substantially equalizes the lifespans of the blue light-source elements 9 of the respective light-source units 10, 20, and 30. In addition, the method downsizes the housing 60 of the projector 100 while reducing noise from the cooling fan 63.

As described above, the light source device 1 of the present example includes the blue light-source unit 10 as a first light-source unit, the red light-source unit 20 as a second light-source unit, and the green light-source unit 30 as a third light-source unit. The blue light-source unit 10, the red light-source unit 20, and the green light-source unit 30 emit light of spectra different from each other. Each of the blue light-source unit 10, the red light-source unit 20, and the green light-source unit 30 includes a heat dissipator and a light source that includes a light emitting device. Specifically, the blue light-source unit 10 includes the blue heat sink 15 as a heat dissipator and the blue light source 11 that includes the blue light-source element 9 as a light emitting device. The red light-source unit 20 includes the red heat sink 25 as a heat dissipator and the red light source 21 that includes the blue light-source element 9 as a light emitting device. The green light-source unit 30 includes the green heat sink 35 as a third heat dissipator and the green light source 31 that includes the blue light-source element 9 as a light emitting device. The blue heat sink 15, the red heat sink 25, and the green heat sink 35 are disposed on the cooling air path between the intake 61 and the vent 62 of the projector 100 as an image projector provided with the cooling fan 63 as a ventilator.

Specifically, the blue heat sink 15, the red heat sink 25, and the green heat sink 35 are disposed in the ascending order of values of T/Q (i.e., ratio R) of the blue light-source unit 10, the red light-source unit 20, and the green light-source unit 30, in the direction of cooling air flow in the cooling air path, that is, from the upstream side to the downstream side of the cooling air path. As described above, "Q" represents a heat generation amount, which is an amount of heat generated from each of the blue light source 11, the red light source 21, and the green light source 31, when the blue light source 11, the red light source 21, and the green light source 31 are driven to obtain predetermined light intensity and lifespan. "T" represents a preset temperature, which is an upper-limit temperature preset for the blue light-source element 9 of each of the blue light-source unit 10, the red light-source unit 20, and the green light-source unit 30 to obtain the predetermined light intensity and lifespan.

With such a configuration, the light source device 1 of the projector 100 attains some advantages as below.

Even when the light sources 11, 21, and 31 of the respective light-source units 10, 20, and 30 are driven to obtain the predetermined light intensity and lifespan, the light sources 11, 21, and 31 of the respective light-source units 10, 20, and 30 are different from each other in heat generation amount due to the luminous efficiency thereof. Accordingly, the light sources 11, 21, and 31 of the respective light-source units 10, 20, and 30 are different from each other also in cooling capacity to keep the light emitting devices disposed in the light sources 11, 21, and 31 of the respective light-source units 10, 20, and 30 at the preset temperature T or lower, which is an upper-limit temperature to obtain the predetermined light intensity and lifespan.

For each of the light-source units 10, 20, and 30, the value of T/Q is correlated to the cooling capacity to cool down the light source when the light sources 11, 21, and 31 are driven to obtain the predetermined light intensity and lifespan. A smaller value of T/Q needs a greater cooling capacity to obtain the predetermined light intensity and lifespan.

Taking in outside air or fresh air via the intake 61 and supplying the air firstly to the heat dissipator of the light-source unit having the smallest value of T/Q enhances heat dissipation from the heat dissipator of the light-source unit, which is cooled down with the greatest cooling capacity by the cooling air among the light-source units 10, 20, and 30. In the meantime, a temperature rise in each of the light sources 11, 21, and 31 is efficiently suppressed.

Thus, by keeping the light emitting devices disposed in the light sources 11, 21, and 31 of the respective light-source units 10, 20, and 30 at the preset temperature T or lower to obtain the predetermined light intensity and lifespan, output of light from the light-source units 10, 20, and 30 remains stable even when the projector 100 is used for a relatively long period of time.

Accordingly, the light sources 11, 21, and 31 of the respective light-source units 10, 20, and 30 are efficiently cooled down. As a consequence, the blue light-source elements 9 disposed in the light sources 11, 21, and 31 of the respective light-source units 10, 20, and 30 have substantially identical lifespans while output of light from the light-source units 10, 20, and 30 remains stable.

Specifically, the light sources 11, 21, and 31 of the respective light-source units 10, 20, and 30 are efficiently cooled down in order from the green light source 31 having the smallest value of T/Q among the light sources 11, 21, and 31. That is, the greatest amount of heat is dissipated from the green heat sink 35 of the green light-source unit 30 most efficiently among the heat sinks 15, 25, and 35. Although the green heat sink 35 of the green light-source unit 30 has a great impact on upsizing the projector 100, the green heat sink 35 is downsized because heat is dissipated from the green heat sink 35 most efficiently. That is, the heat sinks 15, 25, and 35 of the respective light-source units 10, 20, and 30 are downsized according to a heat dissipation amount required for each of the light-source units 10, 20, and 30. As a consequence, the projector 100 is downsized.

In addition, since heat is efficiently dissipated from each of the heat sinks 15, 25, and 35, the cooling fan 63 that causes cooling air flow in the cooling air path is also downsized and rotated at a decreased speed. Accordingly, noise from the cooling fan 63 is reduced.

Thus, the light source device 1 substantially equalizes the lifespans of the blue light-source elements 9 disposed in the light sources 11, 21, and 31 of the respective light-source units 10, 20, and 30 while keeping output of light from the light-source units 10, 20, and 30 stable. In addition, the light source device 1 downsizes the housing 60 of the projector 100, and reduces noise from the cooling fan 63.

As described above, the light source device 1 of the present embodiment incorporated in the projector 100 includes the blue light-source unit 10 as a first light-source unit, the red light-source unit 20 as a second light-source unit, and the green light-source unit 30 as a third light-source unit.

The blue light-source unit 10 includes the blue light source 11 as a first light source that includes the blue light-source element 9 as a light emitting device that emits blue light as light of a first spectrum.

The red light-source unit 20 includes the red light source 21 as a second light source that includes the blue light-source element 9 as a light emitting device that emits blue light as light of the first spectrum. The red light source 21 further includes the red fluorescent layer 23 as a first wavelength converter that receives the blue light (i.e., light of the first spectrum) from the blue light-source element 9 and emits red light as light of a second spectrum.

The green light-source unit 30 includes the green light source 31 as a third light source that includes the blue light-source element 9 as a light emitting device that emits blue light as light of the first spectrum. The green light source 31 further includes the green fluorescent layer 33 as a second wavelength converter that receives the blue light (i.e., light of the first spectrum) from the blue light-source element 9 and emits green light as light of a third spectrum.

The light emitting devices of at least two of the blue light source 11, the red light source 21, and the green light source 31 are the same type of light emitting devices (i.e., blue light-source elements 9). In the present example, the light emitting devices of all the three light sources 11, 21, and 31 are the same type of blue light-source elements 9.

With such a configuration, the light source device 1 of the projector 100 attains some advantages as below.

The blue light-source elements 9 that emit blue light are used as light emitting devices in all the light sources 11, 21, and 31 of the respective light-source units 10, 20, and 30. By use of the light-source elements 9, the blue light source 11 emits blue light, the red light source 21 provided with the red fluorescent layer 23 emits red light, and the green light source 31 provided with the green fluorescent layer 33 emits green light. Although all the light sources 11, 21, and 31 of the respective light-source units 10, 20, and 30 use the same type of light emitting devices (i.e., blue light-source elements 9) that emit blue light, the light sources 11, 21, and 31 emit light of colors different from each other. That is, all the light-source units 10, 20, and 30 use the light emitting devices (i.e., blue light-source element 9) having identical luminous efficiency and temperature characteristics that indicate characteristics of reduction in output of light relative to the temperature. Since at least two of the light-source units 10, 20, and 30 include the same type of light emitting devices, identical maximum operating temperatures are easily given to the blue light-source elements 9 of the light-source units. Accordingly, the blue light-source elements 9 of the light sources used in the light-source units can be appropriately and easily selected. A heat dissipation structure of the light source device 1 can be also appropriately and easily designed, such as arrangement of the light sources and the heat dissipators in the light-source units.

In the light source device 1 of the present embodiment incorporated in the projector 100, the light of the first spectrum is light of a spectrum of blue, that is, blue light. The light of the second spectrum is light of a spectrum of red, that is, red light. The light of the third spectrum is light of a spectrum of green, that is, green light. The light emitting device of each of the blue light source 11, the red light source, 21, and the green light source 31 is a blue light emitting device (e.g., blue light-source element 9) to emit light of the spectrum of blue, that is, blue light.

With such a configuration, the light source device 1 of the projector 100 attains some advantages as below.

The light source device 1 emits blue light, red light, and green light by use of the blue light-source elements 9 having poor temperature characteristics, that is, the characteristics of reduction in output of light relative to the temperature. Accordingly, variation in output of light between the light-source units 10, 20, and 30 are reduced as appropriate, compared to typical light source devices.

In addition, the light sources 11, 21, and 31 are flexibly disposed in the respective light-source units 10, 20, and 30, compared to the typical light source devices. In other words, restrictions on the arrangement of the light sources can be relaxed.

In the light source device 1 of the present embodiment incorporated in the projector 100, each of the blue light-source unit 10, the red light-source unit 20, and the green light-source unit 30 includes a heat dissipation board (e.g., heat sink) as a heat dissipator. Specifically, the blue light-source unit 10 includes the blue heat sink 15. The red light-source unit 20 includes the red heat sink 25. The green light-source unit 30 includes the green heat sink 35.

With such a configuration, the light source device 1 of the projector 100 attains some advantages as below.

Since outside air or fresh air is supplied firstly to the green heat sink 35 of the green light-source unit 30 having the smallest ratio R (i.e., T/Q), from which the greatest amount of heat needs to be dissipated, the green heat sink 35 of the green light-source unit 30 is downsized.

Accordingly, the heat dissipators of the light source device 1 can be downsized overall, contributing to downsizing of the projector 100.

In the light source device 1 of the present embodiment incorporated in the projector 100, the blue light source 11, the red light source 21, and the green light source 31 are disposed in the ascending order of values of T/Q (i.e., ratio R) in the direction of cooling air flow in the cooling air path, that is, from the upstream side to the downstream side of the cooling air path. Specifically, the green light source 31, the red light source 21, and the blue light source 11 are disposed in this order in the direction of cooling air flow in the cooling air path, that is, from the upstream side to the downstream side in the cooling air path. In other words, the ratio R3 (i.e., T3/Q3) of the green light source 31, the ratio R2 (i.e., T2/Q2) of the red light source 21, and the ratio R1 (i.e., T1/Q1) of the blue light source 11 increase in this order.

With such a configuration, the light source device 1 of the projector 100 attains some advantages as below.

Outside air or fresh air is supplied via the intake 61 to the light sources in order from the green light source 31 of the green light-source unit 30 having the smallest ratio R (i.e., T/Q), from which the greatest amount of heat needs to be dissipated, among the light-source units 10, 20, and 30. Accordingly, an amount of heat directly dissipated from each of the light sources 11, 21, and 31 of the respective light-source units 10, 20, and 30 is efficiently increased, further enhancing efficiency in suppression of a temperature rise of each of the light sources 11, 21, and 31 of the respective light-source units 10, 20, and 30.

In addition, in each of the light-source units 10, 20, and 30, the light source and the heat sink are disposed close to each other, substantially at identical positions, in the direction of cooling air flow in the cooling air path. That is, the light source may directly touch the heat sink. Alternatively, a shortened heat transfer device, such as a heat pipe, may be disposed between the light source and the heat sink to shorten a heat transfer distance therebetween. Accordingly, the light source device 1 and the projector 100 can be produced at reduced cost.

With any one of the configurations of the light source device 1 described above, the projector 100 of the present example attains advantages similar to the advantages of the light source device 1 described above.

With any one of the methods for disposing the light source device 1 described above, a method for disposing a light source device in the projector 100 of the present example attains advantages similar to the advantages of any one of the configurations of the light source device 1 described above.

Figure 3:
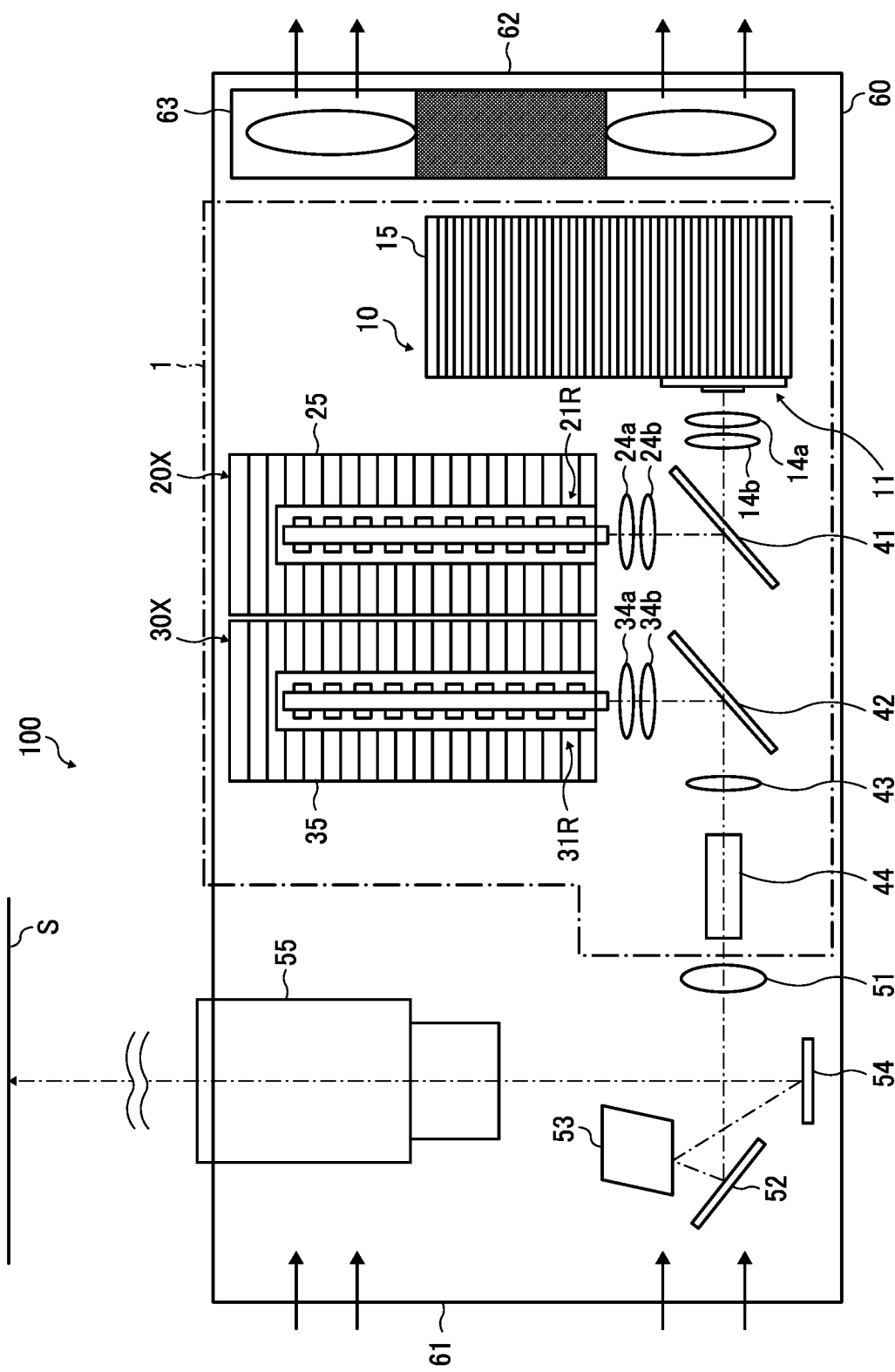
FIG. 3 is a schematic view of a second example of the projector.
Figure 4A:
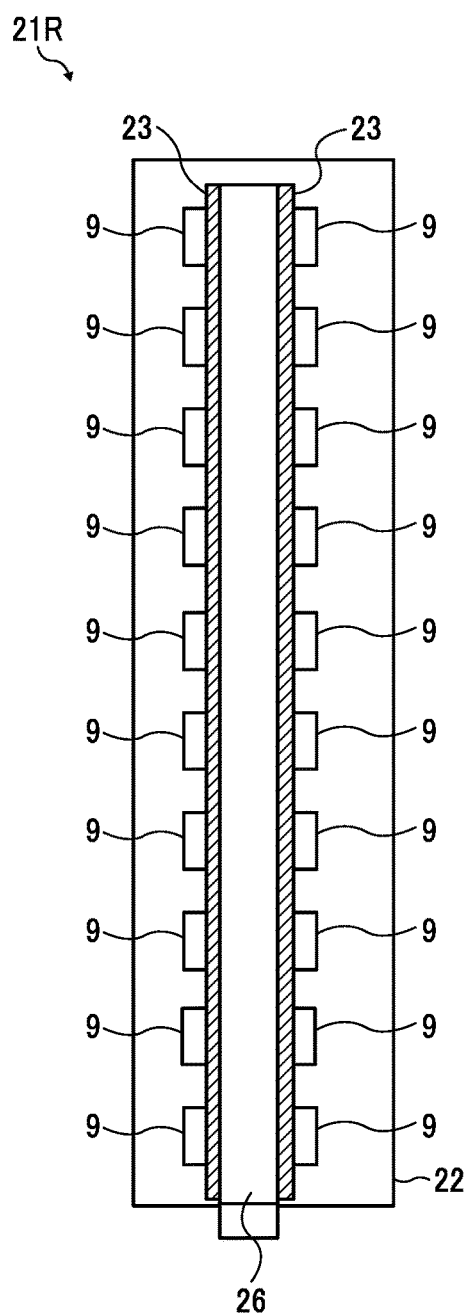
FIG. 4A is a schematic view of a red light source incorporated in a light source device of the projector of FIG. 3.
Figure 4B:
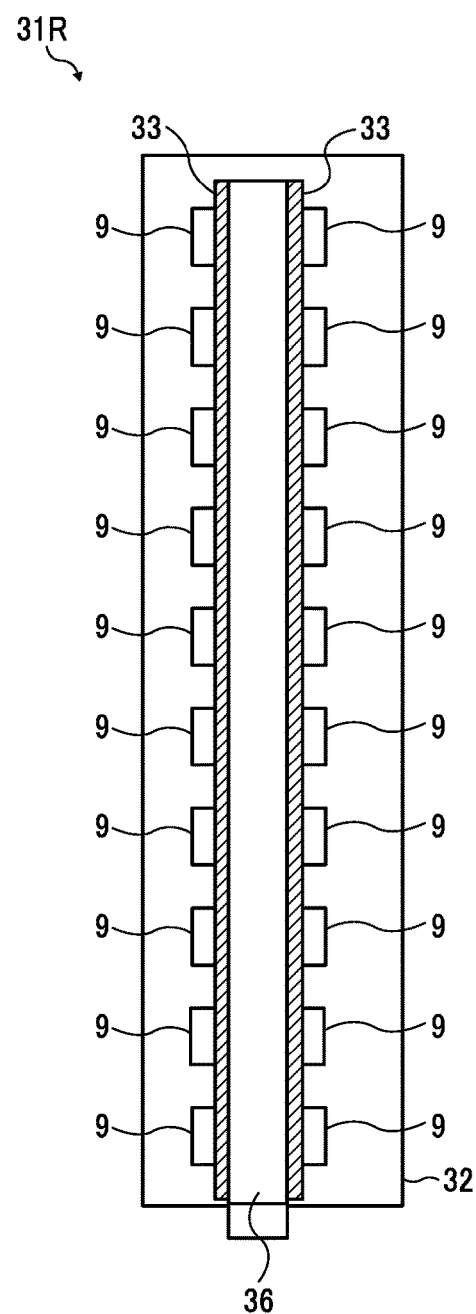
FIG. 4B is a schematic view of a green light source incorporated in the light source device of the projector of FIG. 3.

Referring now to FIGS. 3 through 4B, a description is given of a second example of the projector 100.

For the sake of simplicity, like reference numerals are given to identical or similar constituent elements having the same functions as those of the projector 100 according to the first example. Descriptions of advantages attained by the identical or similar configurations are omitted unless otherwise required.

FIG. 3 is a schematic view of the projector 100 according to the second example. Each of FIGS. 4A and 4B illustrates an inner configuration of a light source of a light-source unit using a rod integrator lens according to the second example. Specifically, FIG. 4A is a schematic view of a red light source 21R of a red light-source unit 20X incorporated in the light source device 1 of the projector 100 of FIG. 3. FIG. 4B is a schematic view of a green light source 31R of a green light-source unit 30X incorporated in the light source device 1 of the projector 100 of FIG. 3.

The projector 100 of the second example is different from the projector 100 of the first example described above in configuration of two of the three light-source units disposed in the light source device 1. Specifically, the red light source 21R of the red light-source unit 20X has a different configuration from the configuration of the red light source 21 of the red light-source unit 20. Similarly, the green light source 31R of the green light-source unit 30X has a different configuration from the configuration of the green light source 31 of the green light-source unit 30.

As illustrated in FIG. 3, in the light source device 1 of the projector 100 of the present example, each of the red light source 21R of the red light-source unit 20X and the green light source 31R of the green light-source unit 30X includes a rod integrator lens.

Specifically, as illustrated in FIG. 4A, the red light source 21R of the red light-source unit 20X includes a rod integrator lens 26 for red (hereinafter referred to as a red rod integrator lens 26) disposed centrally on the red substrate 22. A plurality of light emitting devices (i.e., blue light-source elements 9) is disposed on opposed sides of the red rod integrator lens 26. In the present example, a total of twenty blue light-source elements 9 are disposed on the opposed sides of the red rod integrator lens 26. An electrically required portion of each of the blue light-source elements 9 is coupled to an electrode of the red substrate 22, thus being secured to the red substrate 22.

The red fluorescent layer 23 is disposed between each of the blue light-source elements 9 and the red rod integrator lens 26. As described above, the red fluorescent layer 23 is irradiated with the blue-component light, and generates the red-component fluorescence that is different from the blue-component light.

The blue light emitted by each of the blue light-source elements 9 passes through the red fluorescent layer 23 that changes the blue light to red light. The red light then enters the red rod integrator lens 26. Inside the red rod integrator lens 26, the red light is multiply reflected and equalized. Then, the red rod integrator lens 26 emits the red light from an emission end face thereof.

On the other hand, as illustrated in FIG. 4B, the green light source 31R of the green light-source unit 30X includes a rod integrator lens 36 for green (hereinafter referred to as a green rod integrator lens 36) disposed centrally on the green substrate 32. A plurality of light emitting devices (i.e., blue light-source elements 9) is disposed on opposed sides of the green rod integrator lens 36. In the present example, a total of twenty blue light-source elements 9 are disposed on the opposed sides of the green rod integrator lens 36. An electrically required portion of each of the blue light-source elements 9 is coupled to an electrode of the green substrate 32, thus being secured to the green substrate 32.

The green fluorescent layer 33 is disposed between each of the blue light-source elements 9 and the green rod integrator lens 36. As described above, the green fluorescent layer 33 is irradiated with the blue-component light, and generates the green-component fluorescence that is different from the blue-component light.

The blue light emitted by each of the blue light-source elements 9 passes through the green fluorescent layer 33 that changes the blue light to green light. The green light then enters the green rod integrator lens 36. Inside the green rod integrator lens 36, the green light is multiply reflected and equalized. Then, the green rod integrator lens 36 emits the green light from an emission end face thereof.

As described above, according to the present example, light beams from the integrated blue light-source elements 9 enter the red rod integrator lens 26 via the red fluorescent layer 23 in the red light source 21R of the red light-source unit 20X. Similarly, light beams from the integrated blue light-source elements 9 enter the green rod integrator lens 36 via the green fluorescent layer 33 in the green light source 31R of the green light-source unit 30. With such a configuration, the red light source 21R of the red light-source unit 20X and the green light source 31R of the green light-source unit 30X produce increased light intensity and emit uniform light.

In addition, use of the red rod integrator lens 26 decreases an angle at which the red light is emitted, enhancing the light use efficiency relative to, e.g., the first condenser lens 24a and the second condenser lens 24b that receive the red light from the red light source 21R. Similarly, use of the green rod integrator lens 36 decreases an angle at which the green light is emitted, enhancing the light use efficiency relative to, e.g., the first condenser lens 34a and the second condenser lens 34b that receive the green light from the green light source 31R. Accordingly, these first and second condenser lenses can be downsized. As a consequence, the projector 100 can be produced incorporating the light source device 1 that is downsized while remaining a relatively high output.

As described above, according to the present example, the light source device 1 incorporated in the projector 100 includes the red light source 21R as a second light source in the red light-source unit 20X as a second light-source unit and the green light source 31R as a third light source in the green light-source unit 30X as a third light-source unit. At least one (both in the present example) of the red light source 21R and the green light source 31R is configured as follows.

The red light source 21R includes a plurality of blue light-source elements 9 and the red rod integrator lens 26 that reflects light from the plurality of blue light-source elements 9 a plurality of times, to equalize an amount of light and emit the equalized amount of light. Similarly, the green light source 31R includes a plurality of blue light-source elements 9 and the green rod integrator lens 36 that reflects light from the plurality of blue light-source elements 9 a plurality of times, to equalize an amount of light and emit the equalized amount of light.

With such a configuration, the light source device 1 of the projector 100 attains some advantages as below.

In the red light source 21R, the red fluorescent layer 23 is irradiated with blue light beams emitted by the plurality of blue light-source elements 9, and generates red light beams. The red light beams then enter the red rod integrator lens 26. Similarly, in the green light source 31R, the green fluorescent layer 33 is irradiated with blue light beams emitted by the plurality of blue light-source elements 9, and generates green light beams. The green light beams then enter the green rod integrator lens 36. Such a configuration equalizes an uneven light energy distribution produced by a plurality of light beams to emit light, enhancing a relatively high output.

In addition, use of the red rod integrator lens 26 and the green rod integrator lens 36 decreases an angle at which the light is emitted, enhancing the light use efficiency relative to optical parts that receive the red light and the green light from the red light source 21R and the green light source 31R, respectively, for example.

With any one of the configurations of the light source device 1 described above, the projector 100 of the present example attains advantages similar to the advantages of the light source device 1 described above.

With any one of the methods for disposing the light source device 1 described above, a method for disposing a light source device in the projector 100 of the present example attains advantages similar to the advantages of any one of the configurations of the light source device 1 described above.

Figure 5:
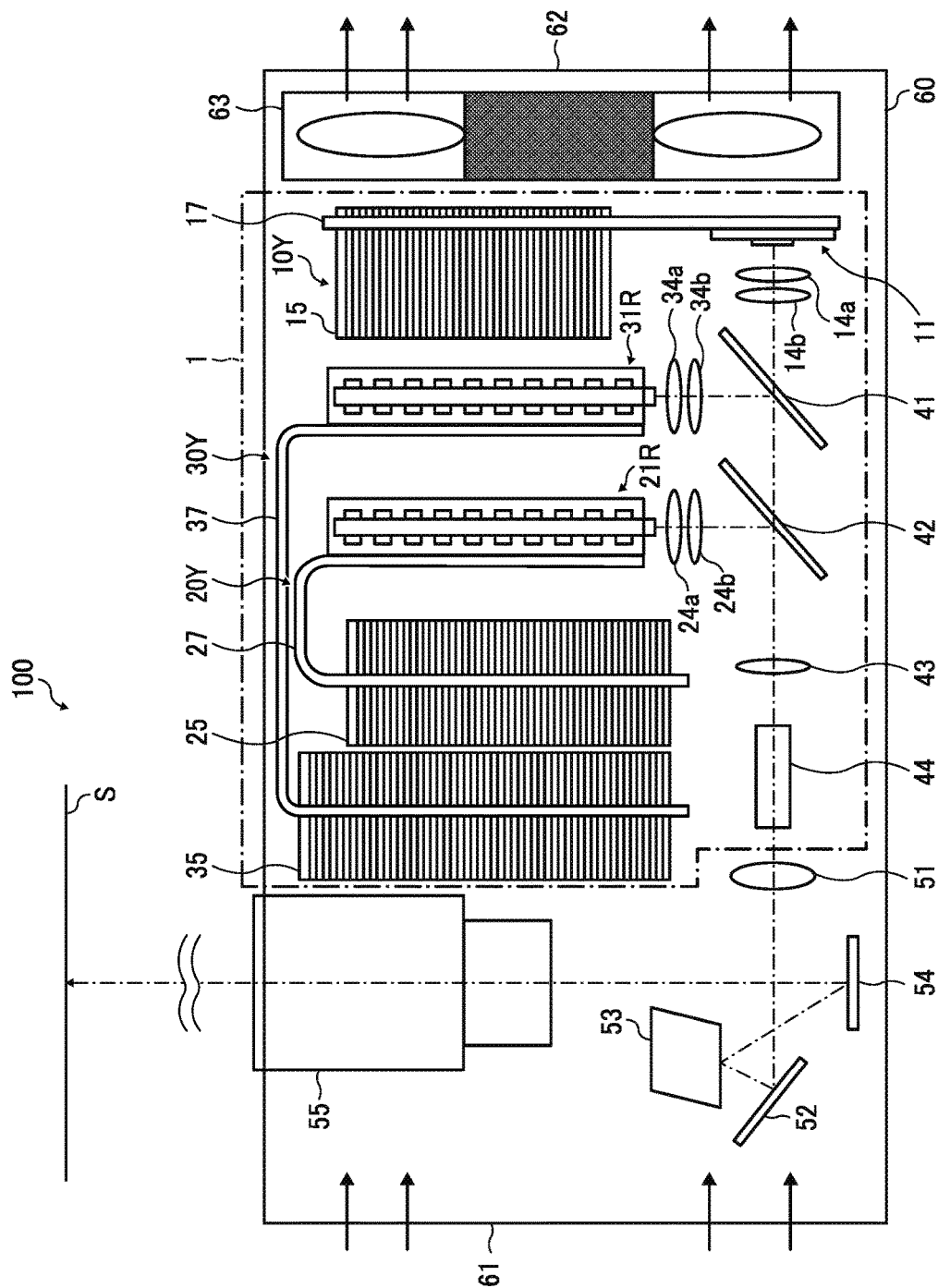
FIG. 5 is a schematic view of a third example of the projector.

Referring now to FIG. 5, a description is given of a third example of the projector 100.

For the sake of simplicity, like reference numerals are given to identical or corresponding constituent elements having the same functions as those of the projector 100 according to the first and second examples. Descriptions of advantages attained by the identical or similar configurations are omitted unless otherwise required.

FIG. 5 is a schematic view of the projector 100 according to the third example.

The projector 100 of the third example is different from the projector 100 of the first and second examples described above in arrangement of the light sources and the heat dissipators of the light-source units disposed in the light source device 1. Specifically, in light source device 1 of the projector 100 according to the present example, the light source and the heat sink are separated from each other in each of the light-source units. A heat pipe is disposed between the light source and the heat sink to transfer heat therebetween. Thus, the heat pipe serves as a heat transfer device.

Although this configuration can be applied to the light source device 1 of the projector 100 according to either of the first and second examples described above, a description is now given of an example of applying this configuration to the light source device 1 of the projector 100 according to the second example.

As illustrated in FIG. 5, the light source device 1 of the projector 100 according to the present example includes a blue light-source unit 10Y as a first light-source unit, a red light-source unit 20Y as a second light-source unit, and a green light-source unit 30Y as a third light-source unit. Similar to the light source device 1 of the projector 100 according to the second example, in the light source device 1 of the projector 100 according to the present example, the red light-source unit 20Y and the green light-source unit 30Y respectively includes the red light source 21R and the green light source 31R. Each of the red light source 21R and the green light source 31R includes a rod integrator lens.

Unlike the projector 100 of the second example, in each of the light-source units 10Y, 20Y, and 30Y in the light source device 1 of the projector 100 according to the present example, the light source and the heat sink are separated from each other.

Specifically, the green heat sink 35 of the green light-source unit 30Y, the red heat sink 25 of the red light-source unit 20Y, the red light source 21R of the red light-source unit 20Y, and the green light source 31R of the green light-source unit 30Y are arranged in this order in the direction of cooling air flow in the cooling air path, that is, from the upstream side of the cooling air path that couples the intake 61 and the vent 62. The blue heat sink 15 of the blue light-source unit 10Y is disposed downstream from the green light source 31R of the green light-source unit 30Y in the direction of cooling air flow in the cooling air path. As illustrated in FIG. 5, the blue light source 11 of the blue light-source unit 10Y is disposed separately from the blue heat sink 15, more specifically, from a downstream end portion of the blue heat sink 15 in the direction of cooling air flow. On the cooling air path, the blue light source 11 and the downstream end portion of the blue heat sink 15 are situated at substantially identical distances from the upstream side of the cooling air path.

A heat pipe 37 for green (hereinafter referred to as a green heat pipe 37) couples the green heat sink 35 and the green light source 31R in the green light-source unit 30Y. Similarly, a heat pipe 27 for red (hereinafter referred to as a red heat pipe 27) couples the red heat sink 25 and the red light source 21R in the red light-source unit 20Y. A heat pipe 17 for blue (hereinafter referred to as a blue heat pipe 17) couples the blue heat sink 15 and the blue light source 11 in the blue light-source unit 10Y.

Heat generated by emission of light in the light source moves to the heat sink via the heat pipe that couples the light source and the heat sink in each of the light-source units.

In the light source device 1 of the present example, the green light source 31R of the green light-source unit 30Y generates a greatest amount of heat among the light sources 11, 21R, and 31R. The red light source 21R of the red light-source unit 20Y generates a smaller amount of heat than the amount of heat generated by the green light source 31R on the one hand, the red light source 21R generates a greater amount of heat than the amount of heat generated by the blue light source 11 on the other hand. The light source 11 of the blue light-source unit 10Y generates a smallest amount of heat among the light sources 11, 21R, and 31R. In short, a relation of $Q3<Q2<Q1$ is satisfied, where Q3 represents the heat generation amount from the green light source 31R, Q2 represents the heat generation amount from the red light source 21R, and Q1 represents the heat generation amount from the blue light source 11.

The light sources 11, 21R, and 31R of the respective light-source units 10Y, 20Y, and 30Y include the blue light-source elements 9 specified identically, for which identical upper-limit temperatures (i.e., preset temperatures T) are preset to obtain the predetermined light intensity and lifespan. Specifically, a blue preset temperature T1 is a temperature preset for the blue light source 11 disposed in the blue light-source unit 10Y. A red preset temperature T2 is a temperature preset for the red light source 21R disposed in the red light-source unit 20Y. A green preset temperature T3 is a temperature preset for the green light source 31R disposed in the green light-source unit 30Y. In the present example, the preset temperatures T1, T2, and T3 are identical to each other. In other words, a relation of $T1=T2=T3$ is satisfied.

As an index of a magnitude relation of cooling capacities of the light-source units 10Y, 20Y, and 30Y to cool down the light sources 11, 21R, and 31R, respectively, the ratio R (i.e., T/Q) is used as described above in the example 1, where "T" represents the preset temperature and "Q" represents the heat generation amount.

Specifically, a blue ratio R1 is a ratio of the blue preset temperature T1 to the blue heat generation amount Q1 (i.e., T1/Q1) of the blue light-source unit 10Y. A red ratio R2 is a ratio of the red preset temperature T2 to the red heat generation amount Q2 (i.e., T2/Q2) of the red light-source unit 20Y. A green ratio R3 is a ratio of the green preset temperature T3 to the green heat generation amount Q3 (i.e., T3/Q3) of the green light-source unit 30Y. In the present example, a relation of $R3<R2<R1$ is satisfied.

That is, as described above in the example 1, the green light source 31R of the green light-source unit 30Y is cooled down with the greatest cooling capacity among the light sources 11, 21R, and 31R. The red light source 21R of the red light-source unit 20Y is cooled down with a cooling capacity smaller than the cooling capacity with which the green light source 31Y is cooled down on the one hand, the red light source 21R is cooled down with a cooling capacity greater than the cooling capacity with which the blue light source 11 is cooled down on the other hand. The blue light source 11 of the blue light-source unit 10Y is cooled down with the smallest cooling capacity among the light sources 11, 21R, and 31R.

As described above, in the present example, the light source and the heat dissipator are separated from each other in each of the light-source units 10Y, 20Y, and 30Y. The heat pipe, as a heat transfer device, is disposed between the light source and the heat dissipator to transfer heat generated in the light source to the heat dissipator (i.e., heat sink). Specifically, the blue light-source unit 10Y includes the blue heat pipe 17. The red light-source unit 20Y includes the red heat pipe 27. The green light-source unit 30Y includes the green heat pipe 37. The heat sinks coupled to the light sources via the heat pipes in light-source units are arranged on the cooling air path in the following order.

Specifically, the green heat sink 35 of the green light-source unit 30Y, the red heat sink 25 of the red light-source unit 20Y, and the blue heat sink 15 of the blue light-source unit 10Y are arranged in this order in the direction of cooling air flow in the cooling air path, that is from the extreme upstream side of the cooling air path.

Thus, the heat sinks 15, 25, and 35 coupled to the respective light sources 11, 21R, and 31R via the respective heat pipes 17, 27, and 37 are disposed in the ascending order of value of T/Q (i.e., ratio R) of the light sources 11, 21R, and 31R of the respective light-source units 10Y, 20Y, and 30Y in the direction of cooling air flow in the cooling air path, that is, from the upstream side to the downstream side of the cooling air path. Accordingly, the present example attains advantages similar to the advantages of the example 1 as described above. For example, the light source device 1 attains at least the following advantages. That is, the light source device 1 substantially equalizes the lifespans of the blue light-source elements 9 disposed in the light sources 11, 21R, and 31R of the respective light-source units 10Y, 20Y, and 30Y. In addition, the light source device 1 downsizes the housing 60 of the projector 100, and reduces noise from the cooling fan 63.

Further, the present example enhances flexible arrangement of the light sources 11, 21R, and 31R of the respective light-source units 10Y, 20Y, and 30Y by disposing only the heat sinks 15, 25, and 35, which are coupled to the respective light sources 11, 21R, and 31R via the respective heat pipes 17, 27, and 37, in the ascending order of values of T/Q (i.e., ratio R) of the light sources 11, 21R, and 31R of the respective light-source units 10Y, 20Y, and 30Y in the direction of cooling air flow in the cooling air path, that is, from the upstream side to the downstream side of the cooling air path.

Accordingly, a surplus space inside the projector 100 is effectively used. Such effective use of space facilitates downsizing of the projector 100.

In the present example, the light source and the heat dissipator (e.g., heat sink) are separated from each other in each of the blue light-source unit 10Y, the red light-source unit 20Y, and the green light-source unit 30Y. Each of the blue light-source unit 10Y, the red light-source unit 20Y, and the green light-source unit 30Y includes a heat transfer device (e.g., heat pipe) to transfer heat generated in the light source to the heat sink separated from the light source. Specifically, the blue light-source unit 10Y includes the blue heat pipe 17. The red light-source unit 20Y includes the red heat pipe 27. The green light-source unit 30Y includes the green heat pipe 37.

However, the present example is not limited to such a configuration. Alternatively, the light source and the heat dissipator may be separated from each other in at least one of the blue light-source unit 10Y, the red light-source unit 20Y, and the green light-source unit 30Y. In such a case, the at least one of the blue light-source unit 10Y, the red light-source unit 20Y, and the green light-source unit 30Y may include a heat dissipator (e.g., heat pipe) to transfer heat generated in the light source to the heat dissipator separated from the light source.

Use of the heat pipe as a heat transfer device with good thermal conductivity enhances a rapid heat transfer from the light source to the heat sink. As a consequence, the heat pipe suppresses a temperature rise in the light source and enhances the cooling capacity, facilitating downsizing of the cooling fan 63 and reducing a rotational speed thereof. Accordingly, the heat pipe further enhances reduction in noise from the cooling fan 63.

The projector 100 according to some examples of the present embodiment has been described above with reference to drawings. Specific configurations thereof are not limited to the configurations provided with the light source device 1 of the examples described above. Various modifications and enhancements are possible without departing from the scope of the present disclosure.

For example, in the light source device 1 according to the second and third examples, the red light source 21R and the green light source 31R include the red rod integrator lens 26 and the green rod integrator lens 36, respectively. However, the light source device 1 according to the second and third examples is not limited to such a configuration. Alternatively, the light source in any one of the three light-source units or in each of the three light-source units may include the rod integrator lens.

In the light source device 1 according to the third example, each of the light-source units includes the heat pipe between the light source and the heat sink separated from each other, to transfer heat generated in the light source to the heat sink through the heat pipe. However, the light source device 1 according to the third example is not limited to such a configuration. Alternatively, at least one or two of the light-source units 10Y, 20Y, and 30Y may include the heat pipe between the light source and the heat sink separated from each other, to transfer heat generated in the light source to the heat sink through the heat pipe.

In light source device 1 according to the examples described above, each of the light-source units includes the heat sink (i.e., heat dissipation board), as a heat dissipator, coupled to the substrate of the light source directly, or indirectly via the heat pipe. However, the light source device 1 according to the examples described above is not limited to such a configuration. Alternatively, each of the light-source units may include a radiator, which is a heat dissipator that employs a water cooling system. Alternatively, a Peltier device may be disposed between the light source and the heat dissipator, between the light source and the heat pipe, or the like, to increase an amount of heat transferred from the light source to the heat dissipator. However, use of the radiator or the Peltier device may increase production cost of the light source device 1 and complicate the configuration of the light source device 1 and the projector 100.

Some configurations of the light source device 1 of the projector 100 have been described above as examples. The embodiments and examples described above attain advantages below in a plurality of aspects A to J.

Initially, a description is given of advantages of the light source device 1 in an aspect A.

A light source device (e.g., light source device 1) includes, a first light-source unit (e.g., blue light-source unit 10), a second light-source unit (e.g., red light-source unit 20), and a third light-source unit (e.g., green light-source unit 30). The first light-source unit, the second light-source unit, and the third light-source unit emit light of spectra different from each other. Each of the first light-source unit, the second light-source unit, and the third light-source unit includes a heat dissipator (e.g., blue heat sink 15, red heat sink 25, and green heat sink 35) and a light source (e.g., blue light source 11, red light source 21, and green light source 31) that includes a light emitting device (e.g., blue light-source element 9). The heat dissipator of the first light-source unit, the heat dissipator of the second light-source unit, and the heat dissipator of the third light-source unit are disposed on a cooling air path between an intake (e.g., intake 61) and a vent (e.g., vent 62) of an image projector (e.g., projector 100) provided with a ventilator (e.g., cooling fan 63). Specifically, the heat dissipator of the first light-source unit, the heat dissipator of the second light-source unit, and the heat dissipator of the third light-source unit are disposed in an ascending order of values of T/Q (e.g., ratio R) of the first light-source unit, the second light-source unit, and the third light-source unit, in a direction of cooling air flow in the cooling air path. "Q" represents a heat generation amount from the light source of each of the first light-source unit, the second light-source unit, and the third light-source unit, when the light source of each of the first light-source unit, the second light-source unit, and the third light-source unit is driven to obtain predetermined light intensity and lifespan. "T" represents a preset, upper-limit temperature for the light emitting device of each of the first light-source unit, the second light-source unit, and the third light-source unit to obtain the predetermined light intensity and lifespan.

Accordingly, as described above in the first through third examples of the present embodiment, the light source device attains some or all of the following advantages, enumeration of which is not exhaustive or limiting.

Even when the light sources of the respective first through third light-source units are driven to obtain the predetermined light intensity and lifespan, the light sources of the light-source units are different from each other in the heat generation amount due to the luminous efficiency thereof. Accordingly, the light sources of the respective first through third light-source units are different from each other also in cooling capacity to keep the light emitting devices disposed in the light sources of the respective first through third light-source units at the preset temperature T or lower, which is an upper-limit temperature to obtain the predetermined light intensity and lifespan.

For each of the light-source units, the value of T/Q is correlated to the cooling capacity to cool down the light source when the light sources are driven to obtain the predetermined light intensity and lifespan. A smaller value of T/Q needs a greater cooling capacity to obtain the predetermined light intensity and lifespan.

According to the aspect A, taking in outside air or fresh air via the intake and supplying the air firstly to the heat dissipator of the light-source unit having the smallest value of T/Q enhances heat dissipation from the heat dissipator of the light-source unit, which is cooled down with the greatest cooling capacity by the cooling air among the light-source units. In the meantime, a temperature rise in each of the light sources is efficiently suppressed.

Thus, by keeping the light emitting devices disposed in the light sources of the respective first through third light-source units at the preset temperature T or lower to obtain the predetermined light intensity and lifespan, output of light from the light-source units remains stable even when the image projector is used for a relatively long period of time.

Accordingly, the light sources of the respective first through third light-source units are efficiently cooled down. As a consequence, the light emitting devices disposed in the light sources of the respective first through third light-source units have substantially identical lifespans while output of light from the light-source units remains stable.

Since the light sources of the respective first through third light-source units are efficiently cooled down in order from the light source having the smallest value of T/Q among the light sources, the greatest amount of heat is dissipated from the heat dissipator of the light-source unit most efficiently among the heat dissipators. While heat is dissipated more efficiently from the heat dissipator of the light-source unit having a greater impact on upsizing the image projector, the heat dissipators of the respective first through third light-source units are downsized according to a heat dissipation amount required for each of the first through third light-source units. As a consequence, the image projector is downsized.

In addition, since heat is efficiently dissipated from each of the heat dissipators, the ventilator that causes cooling air flow in the cooling air path is also downsized and rotated at a decreased speed. Accordingly, noise from the ventilator is reduced.

Accordingly, the light source device substantially equalizes the lifespans of the light emitting devices disposed in the light sources of the respective first through third light-source units while keeping output of light from the first through third light-source units stable. In addition, the light source device downsizes a housing (e.g., housing 60) of the image projector, and reduces noise from the ventilator.

Now, a description is given of advantages of the light source device 1 in an aspect B.

In the aspect A, the light source of the first light-source unit is a first light source including the light emitting device to emit light of a first spectrum (e.g., blue light), The light source of the second light-source unit is a second light source including the light emitting device to emit light of the first spectrum and further including a first wavelength converter (e.g., red fluorescent layer 23) to receive the light of the first spectrum and emit light of a second spectrum (e.g., red light). The light source of the third light source is a third light source including the light emitting device to emit light of the first spectrum and further including a second wavelength converter (e.g., green fluorescent layer 33) to receive the light of the first spectrum and emit light of a third spectrum (e.g., green light). The light emitting devices of at least two of the first light source, the second light source, and the third light source are a same type of light emitting devices (e.g., blue light-source elements 9).

Accordingly, as described above in the first through third examples of the present embodiment, the light source device attains some or all of the following advantages, enumeration of which is not exhaustive or limiting.

Each of the first through third light sources includes a light emitting device that emits the light of the first spectrum. The first light source emits the light of the first spectrum. The second light source emits the light of the second spectrum with the first wavelength converter. The third light source emits the light of the third spectrum with the second wavelength converter. Thus, by use of the light emitting devices that emit the identical light of the first spectrum, the first through third light sources emit light of spectra different from each other. That is, the first through third light sources use the light emitting devices having the identical or substantially identical luminous efficiency and temperature characteristics that indicate characteristics of reduction in output of light relative to the temperature. Since at least two of the first through third light-source units include the same type of light emitting devices, identical or substantially identical maximum operating temperatures are easily given to the light emitting devices of the light-source units. Accordingly, the light emitting devices of the first through third light sources used in the respective first through third light-source units can be appropriately and easily selected. A heat dissipation structure of the light source device can be also appropriately and easily designed, such as arrangement of the light sources and the heat dissipators in the light-source units.

Now, a description is given of advantages of the light source device 1 in an aspect C.

In the aspect B, the light of the first spectrum is light of a spectrum of blue (e.g., blue light). The light of the second spectrum is light of a spectrum of red (e.g., red light). The light of the third spectrum is light of a spectrum of green (e.g., green light). The light emitting device of each of the first light source, the second light source, and the third light source is a blue light emitting device (e.g., blue light-source element 9) to emit light of the spectrum of blue.

Accordingly, as described above in the first through third examples of the present embodiment, the light source device attains some or all of the following advantages, enumeration of which is not exhaustive or limiting.

The light source device emits the light of the spectrum of blue, the light of the spectrum of red, and the light of the spectrum of green, by use of the blue light emitting devices having poor temperature characteristics, that is, the characteristics of reduction in output of light relative to the temperature. Accordingly, variation in output of light between the light-source units are reduced as appropriate, compared to typical light source devices.

In addition, the light sources are flexibly disposed in the respective light-source units, compared to the typical light source devices. In other words, restrictions on the arrangement of the light sources can be relaxed.

Now, a description is given of advantages of the light source device 1 in an aspect D.

In the aspect B or C, at least one of the second light source (e.g., red light source 21R) and the third light source (e.g., green light source 31R) further includes another blue light emitting device (e.g., blue light-source element 9) and a rod integrator lens (e.g., red rod integrator lens 26, and green rod integrator lens 36) to reflect light from the blue light emitting device and the other blue light emitting device a plurality of times, to equalize an amount of light and emit the equalized amount of light.

Accordingly, as described above in the second and third examples of the present embodiment, the light source device attains some or all of the following advantages, enumeration of which is not exhaustive or limiting.

In the at least one of the second light source and the third light source, the wavelength converter (e.g., red fluorescent layer 23, and green fluorescent layer 33) is irradiated with the plurality of light beams of the spectrum of blue, and generates a plurality of light beams of at least one of the spectrum of red and the spectrum of green. The plurality of light beams enters the rod integrator lens. Such a configuration equalizes an uneven light energy distribution produced by the plurality of light beams to emit light, enhancing a relatively high output.

In addition, use of the rod integrator lens decreases an angle at which the light is emitted, enhancing the light use efficiency relative to optical parts that receive the light from the light sources, for example.

Now, a description is given of advantages of the light source device 1 in an aspect E.

In any one of the aspects A through D, the heat dissipator of each of the first light-source unit, the second light-source unit, and the third light-source unit includes a heat dissipation board (e.g., blue heat sink 15, red heat sink 25, and green heat sink 35).

Accordingly, as described above in the first through third examples of the present embodiment, the light source device attains some or all of the following advantages, enumeration of which is not exhaustive or limiting.

Since outside air or fresh air is supplied firstly to the heat dissipation board of the light-source unit having the smallest value of T/Q, from which the greatest amount of heat needs to be dissipated, the heat dissipation board of the light-source unit is downsized.

Accordingly, the heat dissipators of the light source device can be downsized overall, contributing to downsizing of the image projector.

Now, a description is given of advantages of the light source device 1 in an aspect F.

In any one of the aspects A through E, the light source (e.g., blue light source 11) of the first light-source unit, the light source (e.g., red light source 21) of the second light-source unit, and the light source (e.g., green light source 31) of the third light-source unit are disposed in the ascending order of values of T/Q of the first light-source unit, the second light-source unit, and the third light-source unit, in the direction of cooling air flow in the cooling air path.

Accordingly, as described above in the first and second examples of the present embodiment, the light source device attains some or all of the following advantages, enumeration of which is not exhaustive or limiting.

Outside air or fresh air is supplied via the intake to the light sources in order from the light source of the light-source unit having the smallest value of T/Q, from which the greatest amount of heat needs to be dissipated. Accordingly, an amount of heat directly dissipated from each of the light sources of the respective light-source units is efficiently increased, further enhancing efficiency in suppression of a temperature rise in each of the light sources of the respective light-source units.

In addition, in each of the light-source units, the light source and the heat dissipator are disposed close to each other, substantially at identical positions, in the direction of cooling air flow in the cooling air path. That is, the light source may directly touch the heat dissipator. Alternatively, a shortened heat transfer device, such as a heat pipe, may be disposed between the light source and the heat sink to shorten a heat transfer distance therebetween. Accordingly, the light source device and the image projector can be produced at lower cost.

Now, a description is given of advantages of the light source device 1 in an aspect G.

In any one of the aspects A through E, the light source and the heat dissipator are separated from each other in at least one of the first light-source unit, the second light-source unit, and the third light-source unit. The at least one of the first light-source unit, the second light-source unit, and the third light-source unit includes a heat transfer device (e.g., blue heat pipe 17, red heat pipe 27, and green heat pipe 37) to transfer heat generated in the light source to the heat dissipator separated from the light source.

Accordingly, as described above in the third example of the present embodiment, the light source device attains some or all of the following advantages, enumeration of which is not exhaustive or limiting.

The heat dissipators coupled to the respective light sources via the respective heat transfer devices and disposed in the ascending order of values of T/Q of the respective light-source units in the direction of cooling air flow in the cooling air path, that is, from the upstream side to the downstream side of the cooling air path, attain advantages similar to the advantages of any one of the aspects A through E described above. The light source device attains at least the following advantages. That is, the light source device substantially equalizes the lifespans of the light emitting devices disposed in the light sources of the respective first through third light-source units. In addition, the light source device downsizes the housing of the image projector, and reduces noise from the ventilator.

Further, the present aspect enhances flexible arrangement of the light sources of the respective light-source units by disposing only the heat dissipators, which are coupled to the respective light sources via the respective heat transfer devices, in the ascending order of values of T/Q of the light-source units in the direction of cooling air flow in the cooling air path, that is, from the upstream side to the downstream side of the cooling air path.

Accordingly, a surplus space inside the image projector is effectively used. Such effective use of space further facilitates downsizing of the image projector.

Now, a description is given of advantages of the light source device 1 in an aspect H.

In the aspect G, The heat transfer device is a heat pipe (e.g., blue heat pipe 17, red heat pipe 27, and green heat pipe 37).

Accordingly, as described above in the third example of the present embodiment, the light source device attains some or all of the following advantages, enumeration of which is not exhaustive or limiting.

Use of the heat pipe as a heat transfer device with good thermal conductivity enhances a rapid heat transfer from the light source to the heat sink. As a consequence, the heat pipe suppresses a temperature rise in the light source and enhances the cooling capacity, facilitating downsizing of the ventilator and reducing a rotational speed thereof.

Accordingly, the heat pipe further enhances reduction in noise from the ventilator.

Now, a description is given of advantages of the projector 100 in an aspect I.

An image projector (e.g., projector 100) includes a housing (e.g., housing 60) and a ventilator (e.g., cooling fan 63). The housing includes an intake (e.g., intake 61) and a vent (e.g., vent 62). The ventilator causes cooling air flow in a cooling air path between the intake and the vent. The image projector further includes a light source device that includes a plurality of light-source units (e.g., blue light-source unit 10, red light-source unit 20, and green light-source unit 30). Each of the plurality of light-source units includes a heat dissipator (e.g., blue heat sink 15, red heat sink 25, and green heat sink 35) disposed on the cooling air path. The light source device is a light source device (e.g., light source device 1) according to any one of the aspects A through H described above in the image projector.

Accordingly, as described above in the first through third examples of the present embodiment, the image projector attains some or all of the following advantages, enumeration of which is not exhaustive or limiting.

That is, the image projector attains advantages similar to the advantages of the light source device according to any one of the aspects A through H described above.

Now, a description is given of advantages of a method for disposing the light source device 1 in the image projector 100 in an aspect J.

An image projector (e.g., projector 100) includes a housing (e.g., housing 60) and a ventilator (e.g., cooling fan 63). The housing includes an intake (e.g., intake 61) and a vent (e.g., vent 62). The ventilator causes cooling air flow in a cooling air path between the intake and the vent. A light source device includes a plurality of light-source units (e.g., blue light-source unit 10, red light-source unit 20, and green light-source unit 30). The plurality of light-source units emits light of spectra different from each other. Each of the plurality of light-source units includes a heat dissipator (e.g., blue heat sink 15, red heat sink 25, and green heat sink 35) disposed on the cooling air path, and a light source (e.g., blue light source 11, light source 21, and light source 31). The light source includes a light emitting device (e.g., blue light-source elements 9). The light source device is a light source device (e.g., light source device 1) according to any one of the aspects A through H described above. A method for disposing s light source device in an image projector includes disposing the heat dissipator of the first light-source unit, the heat dissipator of the second light-source unit, and the heat dissipator of the third light-source unit on the cooling air path in an ascending order of values of T/Q of the first light-source unit, the second light-source unit, and the third light-source unit, in a direction of the cooling air flow in the cooling air path. "Q" represents a heat generation amount from the light source of each of the first light-source unit, the second light-source unit, and the third light-source unit, when the light source of each of the first light-source unit, the second light-source unit, and the third light-source unit is driven to obtain predetermined light intensity and lifespan. "T" represents a preset, upper-limit temperature for the light emitting device of each of the first light-source unit, the second light-source unit, and the third light-source unit to obtain the predetermined light intensity and lifespan.

Accordingly, as described above in the first through third examples of the present embodiment, the method for disposing a light source device in an image projector attains some or all of the following advantages, enumeration of which is not exhaustive or limiting.

That is, the method for disposing a light source device in an image projector attains advantages similar to the advantages of the light source device according to any one of the aspects A through H described above.

Although the present disclosure makes reference to specific embodiments, it is to be noted that the present disclosure is not limited to the details of the embodiments described above and various modifications and enhancements are possible without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

Any one of the above-described operations may be performed in various other ways, for example, in an order different from the one described above.

Further, any of the above-described devices or units can be implemented as a hardware apparatus, such as a specialpurpose circuit or device, or as a hardware/software combination, such as a processor executing a software program.

Further, as described above, any one of the above-described and other methods of the present disclosure may be embodied in the form of a computer program stored in any kind of storage medium. Examples of storage mediums include, but are not limited to, flexible disk, hard disk, optical discs, magneto-optical discs, magnetic tapes, non-volatile memory cards, read only memory (ROM), etc.

Alternatively, any one of the above-described and other methods of the present disclosure may be implemented by an application specific integrated circuit (ASIC), prepared by interconnecting an appropriate network of conventional component circuits or by a combination thereof with one or more conventional general purpose microprocessors and/or signal processors programmed accordingly.

What is claimed is:

1. A light source device comprising:
   a first light-source unit;
   a second light-source unit; and
   a third light-source unit,
   the first light-source unit, the second light-source unit, and the third light-source unit emitting light of spectra different from each other,
   each of the first light-source unit, the second light-source unit, and the third light-source unit including a heat dissipator and a light source, the light source including a light emitting device,
   the heat dissipator of the first light-source unit, the heat dissipator of the second light-source unit, and the heat dissipator of the third light-source unit being disposed in an ascending order of values of T/Q of the first light-source unit, the second light-source unit, and the third light-source unit, in a direction of cooling air flow,
   where "Q" represents a heat generation amount from the light source of each of the first light-source unit, the second light-source unit, and the third light-source unit, when the light source of each of the first light-source unit, the second light-source unit, and the third light-source unit is driven to obtain predetermined light intensity and lifespan, and "T" represents a preset, upper-limit temperature for the light emitting device of each of the first light-source unit, the second light-source unit, and the third light-source unit to obtain the predetermined light intensity and lifespan.

2. The light source device according to claim 1, wherein the light source of the first light-source unit is a first light source that includes the light emitting device to emit light of a first spectrum,
   wherein the light source of the second light-source unit is a second light source that includes the light emitting device to emit light of the first spectrum and a first wavelength converter to receive the light of the first spectrum and emit light of a second spectrum,
   wherein the light source of the third light-source unit is a third light source that includes the light emitting device to emit light of the first spectrum and a second wavelength converter to receive the light of the first spectrum and emit light of a third spectrum, and
   wherein the light emitting devices of at least two of the first light source, the second light source, and the third light source are a same type of light emitting devices.

3. The light source device according to claim 2, wherein the light of the first spectrum is light of a spectrum of blue, the light of the second spectrum is light of a spectrum of red, and the light of the third spectrum is light of a spectrum of green, and
   wherein the light emitting device of each of the first light source, the second light source, and the third light source is a blue light emitting device to emit light of the spectrum of blue.

4. The light source device according to claim 3, wherein the blue light emitting device is a first blue light emitting device, and
   wherein at least one of the second light source and the third light source further includes:
   a second blue light emitting device; and
   a rod integrator lens to reflect light from the first blue light emitting device and the second blue light emitting device a plurality of times, to emit an equalized amount of light.

5. The light source device according to claim 1, wherein the heat dissipator of each of the first light-source unit, the second light-source unit, and the third light-source unit includes a heat dissipation board.

6. The light source device according to claim 1, wherein the light source of the first light-source unit, the light source of the second light-source unit, and the light source of the third light-source unit are disposed in the ascending order of values of T/Q of the first light-source unit, the second light-source unit, and the third light-source unit, in the direction of cooling air flow.

7. The light source device according to claim 1, wherein the light source and the heat dissipator are separated from each other in at least one of the first light-source unit, the second light-source unit, and the third light-source unit, and
   wherein the at least one of the first light-source unit, the second light-source unit, and the third light-source unit further includes a heat transfer device to transfer heat generated in the light source to the heat dissipator separated from the light source.

8. The light source device according to claim 7, wherein the heat transfer device is a heat pipe.

9. An image projector comprising:
   a housing including an intake and a vent;
   a ventilator to cause cooling air flow between the intake and the vent; and
   a light source device including:
   a first light-source unit;
   a second light-source unit; and
   a third light-source unit,
   the first light-source unit, the second light-source unit, and the third light-source unit emitting light of spectra different from each other,
   each of the first light-source unit, the second light-source unit, and the third light-source unit including a heat dissipator and a light source, the light source including a light emitting device,
   the heat dissipator of the first light-source unit, the heat dissipator of the second light-source unit, and the heat dissipator of the third light-source unit being disposed in an ascending order of values of T/Q of the first light-source unit, the second light-source unit, and the third light-source unit, in a direction of the cooling air flow,
   where "Q" represents a heat generation amount from the light source of each of the first light-source unit, the second light-source unit, and the third light-source unit, when the light source of each of the first light-source unit, the second light-source unit, and the third light-source unit is driven to obtain predetermined light intensity and lifespan, and "T" represents a preset, upper-limit temperature for the light emitting device of each of the first light-source unit, the second light-source unit, and the third light-source unit to obtain the predetermined light intensity and lifespan.

10. A method for disposing a light source device in an image projector, the image projector including a housing and a ventilator, the housing including an intake and a vent, the ventilator causing cooling air flow between the intake and the vent, the light source device including a first light-source unit, a second light-source unit, and a third light-source unit emitting light of spectra different from each other, each of the first light-source unit, the second light-source unit, and the third light-source unit including a heat dissipator and a light source, the light source including a light emitting device, the method comprising disposing the heat dissipator of the first light-source unit, the heat dissipator of the second light-source unit, and the heat dissipator of the third light-source unit in an ascending order of values of T/Q of the first light-source unit, the second light-source unit, and the third light-source unit, in a direction of the cooling air flow, where "Q" represents a heat generation amount from the light source of each of the first light-source unit, the second light-source unit, and the third light-source unit, when the light source of each of the first light-source unit, the second light-source unit, and the third light-source unit is driven to obtain predetermined light intensity and lifespan, and "T" represents a preset, upper-limit temperature for the light emitting device of each of the first light-source unit, the second light-source unit, and the third light-source unit to obtain the predetermined light intensity and lifespan.

* * * * *